Patented Feb. 14, 1939

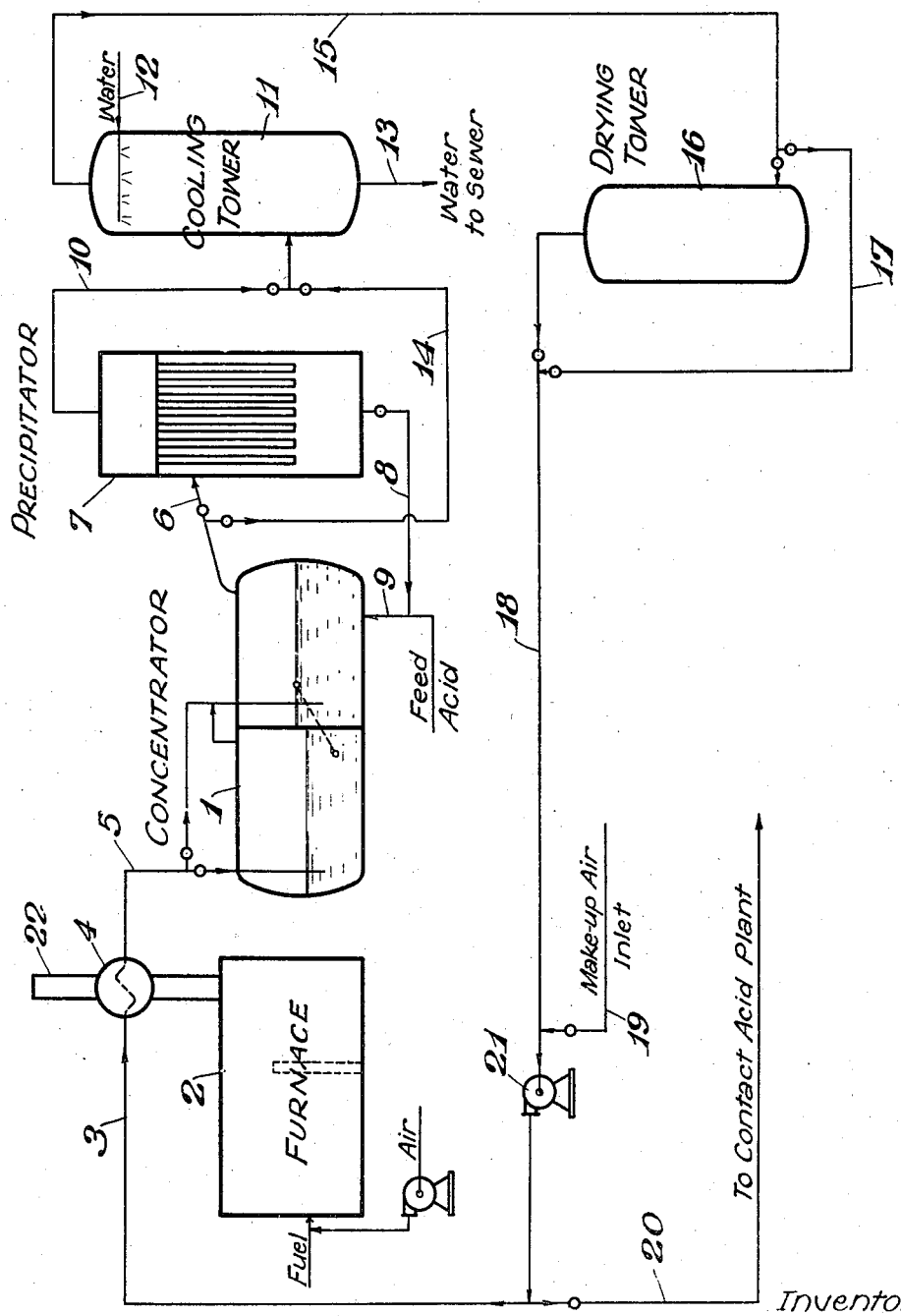

2,146,792

UNITED STATES PATENT OFFICE 2,146,792

SULPHURIC ACID MANUFACTURE

Frank G. Brueckmann and Willard G. Roesch, Hammond, Ind., assignors to Standard Oil Company, Chicago, Ill., a corporation of Indiana Application December 5, 1936, Serial No. 114,421

5 Claims. (Cl. 23—171)

This invention relates to the art of concentrating sulphuric acid and pertains more particularly to a process for reducing the so called acid nuisance incident to such concentrating operations.

It is an object of our invention to provide an acid concentrating process wherein there is no acid released to the atmosphere to cause a nuisance.

It is an object of our invention to provide a process for concentrating sulphuric acid wherein the vapors necessarily incident to the operation are reclaimed for use in the manufacture of new acid rather than discharged to the atmosphere to constitute a nuisance, as is the case with known processes.

The drawing shows diagrammatically an arrangement of apparatus for carrying out our process.

In the broad aspect of our invention we contemplate the recycling of at least a portion of the gases which have been passed through the body of acid. Only a fraction of the total flow of gases is removed from the system as differentiated from prior arrangements, wherein the total vapor exhausted from the concentrator equipment is vented to the atmosphere.

In the arrangement of apparatus for carrying out our invention the acid to be concentrated is maintained in the usual concentrator vessel 1 which may be of the multistage type. Fuel is burned in the furnace 2 which supplies heat to a stream of gases passing through a conduit 3 by means of an indirect heat exchanger 4, the furnace gases after passing through the heat exchanger being vented to the atmosphere through the usual stack 22. The heat exchanger 4 is shown diagrammatically only and may be, in actual practice, of the Ljungstrom type or comprise a plurality of tubes in the back pass or convection section of the furnace. The furnace is supplied with the usual source of fuel and air under pressure of a blower. The gases containing the heat of combustion are led by a conduit 5 from the heat exchanger 4 into contact with the body of acid maintained in the concentrator 1. From the concentrator 1 the hot gases containing water removed from the acid, entrained sulphur trioxide, sulphur dioxide, and entrained acid are passed through a conduit 6 to an acid precipitator 7, preferably of the type well known to the art as a Cottrell precipitator. The acid which is precipitated may be led back by way of a conduit 8 to the feed line 9 of the acid concentrator or otherwise disposed of in such manner as indicated by particular circumstances. From the precipitator the stream is passed by way of a conduit 10 into a water removal zone which may comprise a scrubbing tower 11, wherein water introduced through a conduit 12 is sprayed or otherwise passed counter-current to the gases introduced at the lower portion of the tower. The major portion of the water contained in the gases is thus precipitated and discharged through a conduit 13 to the sewer, or otherwise disposed of, such for example as by-passing it through a water reconditioning plant.

An acid separator drum may be substituted for the acid precipitator 7 or where the amount of entrained acid leaving the concentrator is very small both may be dispensed with and the vapors leaving the concentrator admitted directly to the scrubbing tower through a by-pass conduit 14 controlled by suitable valves as indicated.

The dehydrated gases from the water removal zone are passed through a conduit 15 to a drying tower 16 for the further removal of moisture. The drying agent in this tower may be, for example, sulphuric acid or calcium chloride. We have indicated a by-pass line 17 comprising suitable valves for by-passing all or any portion of the dehydrated gases around this drying tower in case it is not desired under the special circumstances of particular installation to employ this dryer. At least the greater portion of the dehydrated gases are continuously returned through a conduit 18 to be recycled through the above enumerated steps, thus increasing the concentration of sulphur dioxide to a sufficient value acceptable to the acid contact plant. A blower 21, for example, is interposed in the conduit 18 to maintain the necessary pressure.

The concentration of sulphur dioxide is brought up to a value acceptable by an acid manufacturing plant, such for example as a contact plant, by continuously recycling through the above steps. This value is usually about eight to ten per cent. A small percentage of the total flow of gases in the process is continuously removed through a conduit 20 to an acid contact plant (not shown) for use in the manufacture of new acid. Make-up air is admitted through a conduit 19 to the process, preferably in front of the blower 21, as shown, to replace the gases removed to the contact plant.

It is thus seen that we have disclosed a process for concentrating sulphuric acid wherein the gases are not discharged to the atmosphere to constitute a nuisance as in prior processes but these gases are recovered for the manufacture of new acid. This is done by recycling the gases free from contamination with the furnace vapors, to bring them up to the proper concentration for use in an acid manufacturing plant.

Since many different embodiments of this invention may be made without departing from the spirit thereof, it is to be understood that we do not limit ourselves to the foregoing description except as indicated by the scope of the following claims.

We claim:

1. A process for concentrating sulphuric acid comprising heating a stream of gases in a furnace zone by indirect heat exchange, passing the heated stream of gases into contact with a body of acid to be concentrated in a concentrating zone, passing at least a portion of the gases from said concentrating zone to a water removal zone, said last named gases comprising water removed from the acid, sulphur dioxide, sulphur trioxide, and other gases, removing at least a major portion of the water from said gases in said water removal zone, recycling the said dehydrated gases through the above named steps, to increase thereby the concentration of sulphur dioxide in said stream, continuously removing a small percentage of the stream of gases to an acid contact plant for the conversion of the sulphur compounds therein to sulphuric acid and introducing make-up air into the cycle to replace the gases so removed.

2. A process for concentrating sulphuric acid comprising heating a stream of gases in a furnace zone, by an indirect heat exchange, passing a heated stream of gases into contact with a body of acid to be concentrated in a concentrating zone, passing at least a portion of the gases from said concentrating zone to a water removal zone, said last named gases comprising water removed from the acid, sulphur dioxide, sulphur trioxide and other gases, removing at least a major portion of the water from said gases in said water removal zone, passing at least a portion of said dehydrated gases through a drying zone to remove additional moisture therefrom, recycling said gases from said drying zone continuously through the above enumerated steps to raise the concentration of the sulphur compounds therein to a value adaptable to be conveyed to an acid manufacturing plant for conversion into sulphuric acid, continuously removing a small percentage of the stream to such an acid manufacturing plant, and introducing make-up air into the cycle to take the place of the gases so removed.

3. A process for concentrating sulphuric acid comprising heating a stream of gases in a furnace zone by indirect heat exchange, passing the heated stream of gases into contact with a body of acid in a concentrating zone, passing at least a portion of the gases from said concentrating zone through a precipitating zone, precipitating at least a major portion of the entrained acid and returning same to the concentrator, passing at least a portion of the gases from said precipitating zone to a water removal zone, said last named gases comprising water removed from the acid, sulphur dioxide, sulphur trioxide and other gases, removing at least the major portion of the water from said gases, passing at least a portion of the dehydrated gases through a drying zone and removing additional moisture therefrom, recycling the gases from said drying zone through the above enumerated steps, thus increasing the concentration of sulphur dioxide in said stream, continuously removing a small percentage of the stream to an acid contact plant for conversion of the sulphur compounds contained therein to sulphuric acid and introducing make-up air into the cycle.

4. In combination, an acid concentrating vessel adapted to contain a body of sulphuric acid, means for heating a stream of gases, means for supplying said heated stream to said acid concentrating vessel, means for withdrawing a stream of gases containing water and sulphur dioxide from said concentrating vessel, means for dehydrating said last-mentioned stream of gases, means for returning a major portion of said dehydrated gases to said heating means, an acid manufacturing plant adapted to convert sulphur dioxide into sulphuric acid, and means for supplying a minor portion of said dehydrated gases to said acid manufacturing plant.

5. In combination, an acid concentrating vessel adapted to contain a body of sulphuric acid, a furnace for supplying hot flue gases, indirect heat exchange means for transferring heat from said flue gases to a stream of gases containing sulphur dioxide, means for conducting said stream from said heat exchange means to said acid concentrating vessel, means for withdrawing a stream of gases containing water and sulphur dioxide from said concentrating vessel, means for dehydrating said last-mentioned stream of gases including a water-removal tower equipped with a water spray in the upper portion thereof, means for returning a major portion of said dehydrated gases to said heat exchange means, an acid manufacturing plant adapted to convert sulphur dioxide into sulphuric acid, and means for supplying a minor portion of said dehydrated gases to said acid manufacturing plant.

FRANK G. BRUECKMANN.
WILLARD G. ROESCH.